United States Patent
Wu

(10) Patent No.: US 6,822,636 B2
(45) Date of Patent: Nov. 23, 2004

(54) WIRELESS CONTROL DEVICE FOR A COMPUTER MONITOR

(76) Inventor: Chih-Hsien Wu, PO Box 82-144, Taipei (TW)

(*) Notice: Subject to any disclaimer, the term of this patent is extended or adjusted under 35 U.S.C. 154(b) by 272 days.

(21) Appl. No.: 10/224,438

(22) Filed: Aug. 21, 2002

(65) Prior Publication Data

US 2004/0046731 A1 Mar. 11, 2004

(51) Int. Cl.$^7$ .............................. G09G 5/00; G09G 5/08
(52) U.S. Cl. ....................... 345/156; 345/158; 345/161; 345/163; 345/168
(58) Field of Search ................................ 345/156, 157, 345/158, 161, 163, 167, 168; 375/341, 262

(56) References Cited

U.S. PATENT DOCUMENTS 5,990,868 A * 11/1999 Frederick .................... 345/158
6,078,789 A * 6/2000 Bodenmann et al. ...... 455/41.2
6,327,317 B1 * 12/2001 Chennakeshu et al. ..... 375/341

* cited by examiner

Primary Examiner—Vijay Shankar
(74) Attorney, Agent, or Firm—Leong C. Lei

(57) ABSTRACT

A wireless control device for a computer monitor is disclosed. The wireless control includes a wireless receiver mounted onto the monitor of the computer and connected to circuit of the monitor for receiving signals emitted from wireless input device such as a mouse, key board, electronic joystick); and GVA signal transmission line to transmit command to a host computer for operation, thereby the signal form the wireless input device is directly receive by the monitor without using the host computer so as to reduce emission power of the wireless input device and the input device and the monitor device are mutually integrated and the efficiency of the computer operation environment is changed.

6 Claims, 4 Drawing Sheets

WIRELESS CONTROL DEVICE FOR A COMPUTER MONITOR

BACKGROUND OF THE INVENTION a) Technical Field of the Invention

The present invention relates to a wireless control device, and in particular to a wireless device having a receiver directly mounted onto a monitor to receiver signal from an input device.

b) Description of the Prior Art

Taiwanese patent publication Nos. 462560 and 458333 relate to sensing device of a wireless mouse and a signal receiving device for a wireless keyboard, wherein the signal wire of the input devices, such as mouse or keyboard is changed to wireless emitter, and the receiving device of the input device is mounted onto the host computer, so as to improved the input device which is restricted by the wires.

In the conventional structure, the input signal is received by the receiving device of the host computer and is then transmitted to the monitor. However, due to the space needed, the host computer is placed underneath a desk and the signal from the wireless emitter has to be aligned with the receiving device so as to fully receive the signal complete, other wise the intensity of the emitted signals have to be increased and the computer host below the desk to fully receive the signals of the wireless transmission. However, the drawback of such structure is that the increasing of the signal intensity will affect the other electrical peripheral appliances, and therefore other electronic microcontroller will be damaged. Accordingly, it is an object of the present invention to provide a wireless control device of a computer monitor which mitigates the above drawbacks.

SUMMARY OF THE INVENTION

An object of the present invention is to provide a wireless control for a computer monitor where the emission intensity does not enhanced so as to affect other peripheral devices.

Accordingly, it is an object of the present invention to provide a wireless control device for a computer monitor comprising a wireless receiver mounted onto the monitor of the computer and connected to circuit of the monitor for receiving signals emitted from wireless input device; and GVA signal transmission line to transmit command to a host computer for operation, thereby the signal form the wireless input device is directly receive by the monitor without using the host computer so as to reduce emission power of the wireless input device and the input device and the monitor device are mutually integrated and the efficiency of the computer operation environment is changed.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
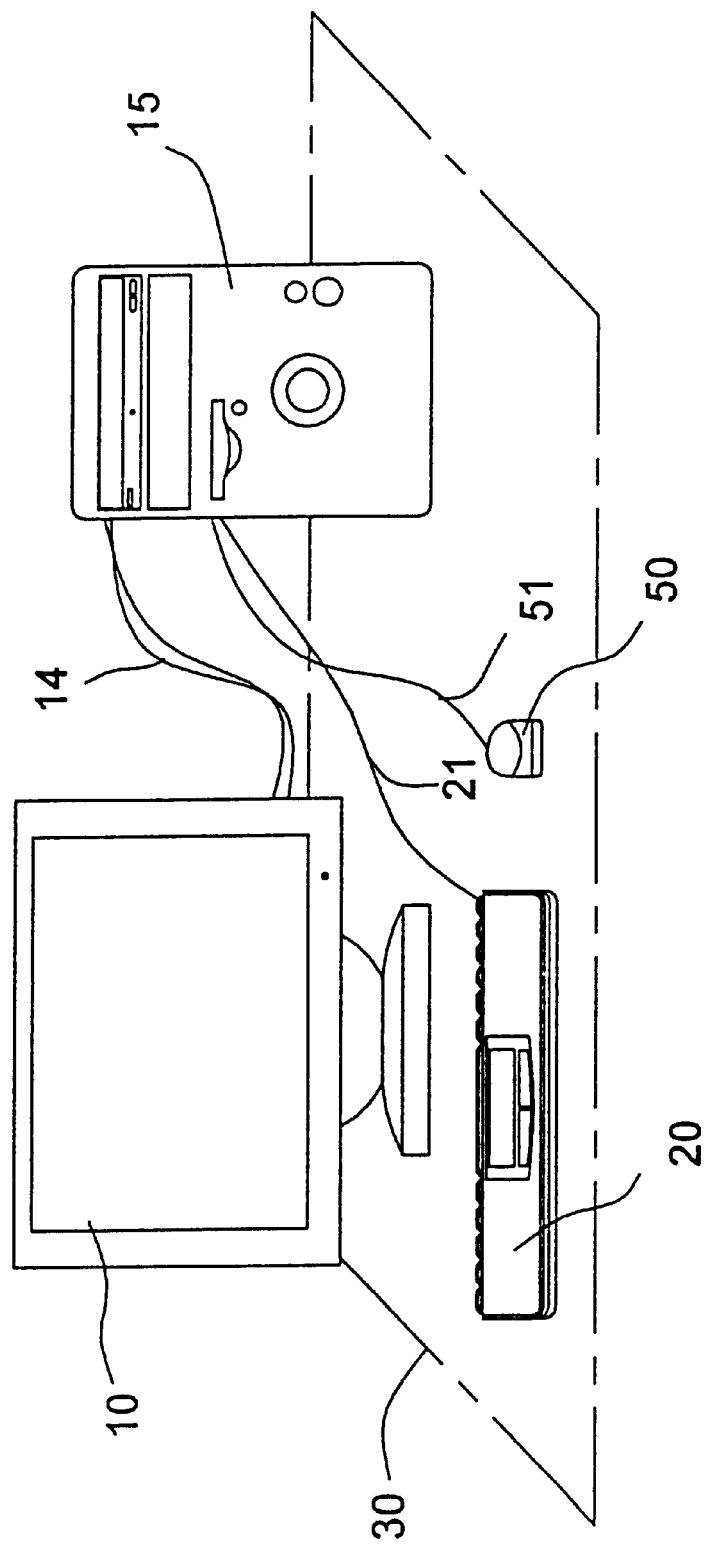
FIG. 1 is a schematic view showing the layout of a conventional computer device.

Referring to FIG. 1, the conventional computer generally comprises a monitor display 10, a host computer 15, a keyboard 20 and a computer mouse 50. However, the keyboard 20 and the computer mouse 15 are connected to the host computer via wires 21 and 51 respectively.

Figure 2:
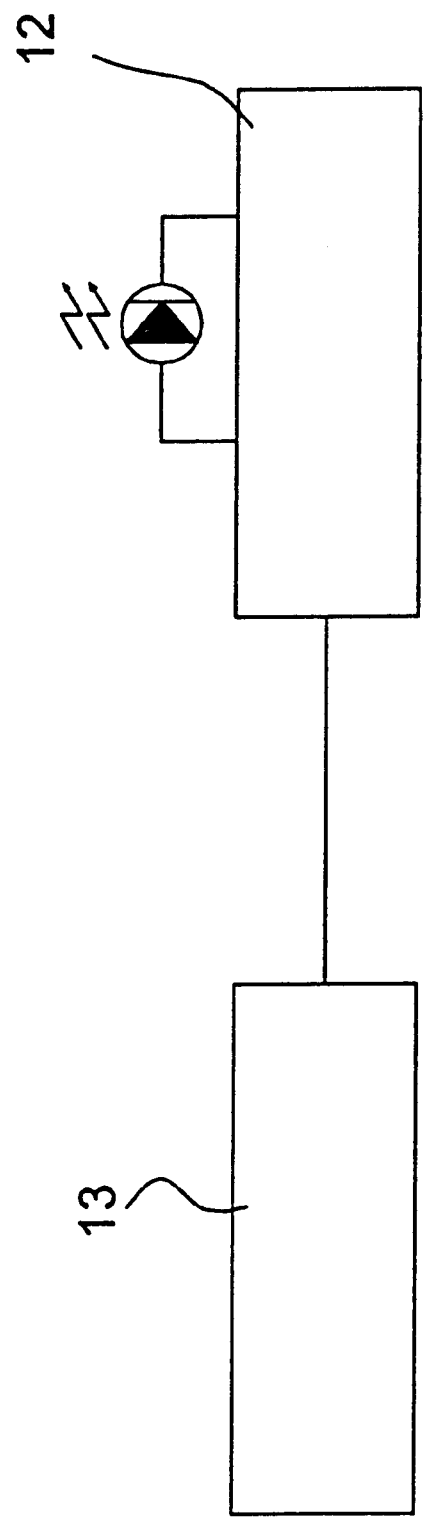
FIG. 2 is a circuit block diagram of a preferred embodiment of the present invention in accordance with the present invention.
Figure 3:
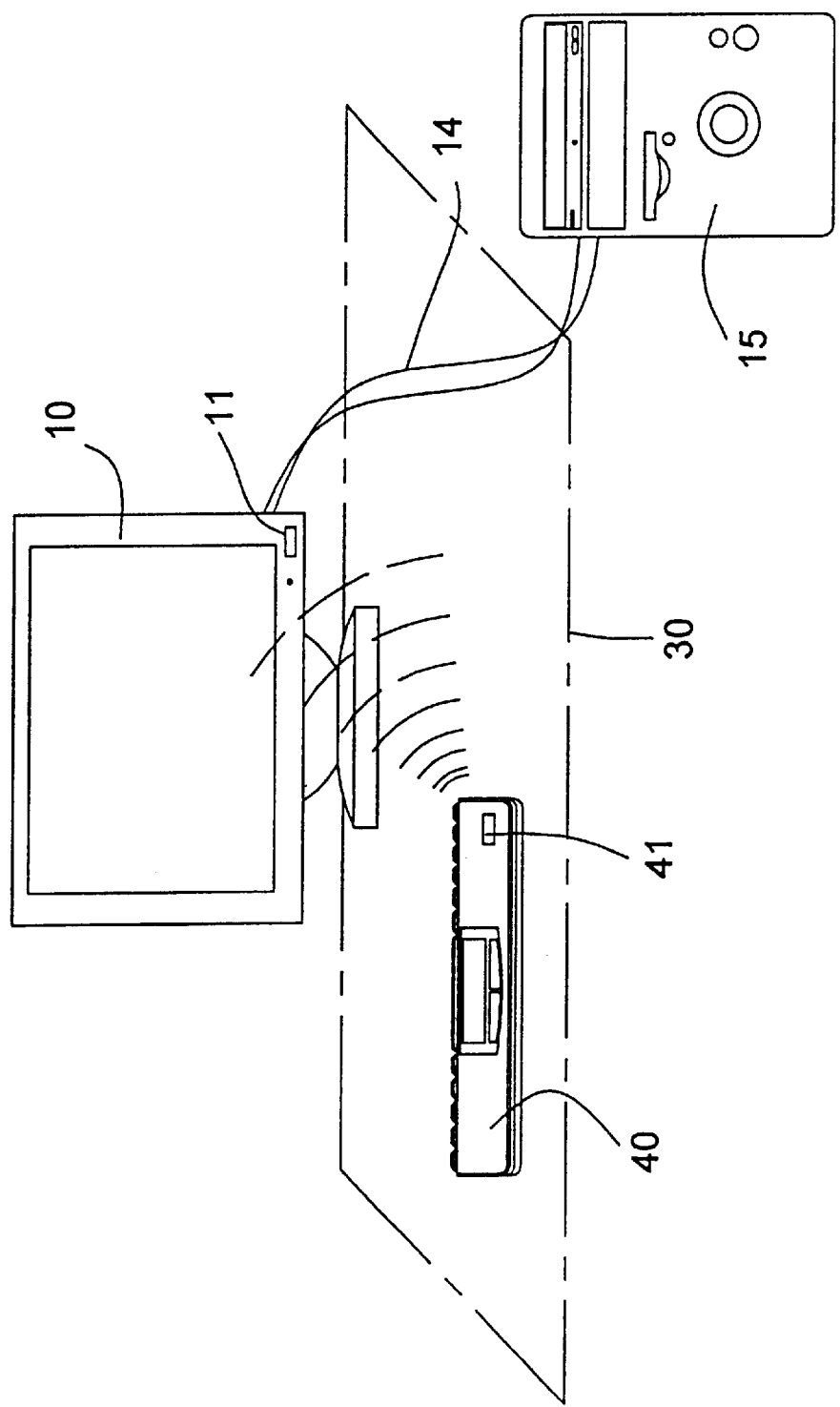
FIG. 3 is a perspective view of the preferred embodiment in accordance with the present invention.
Figure 4:
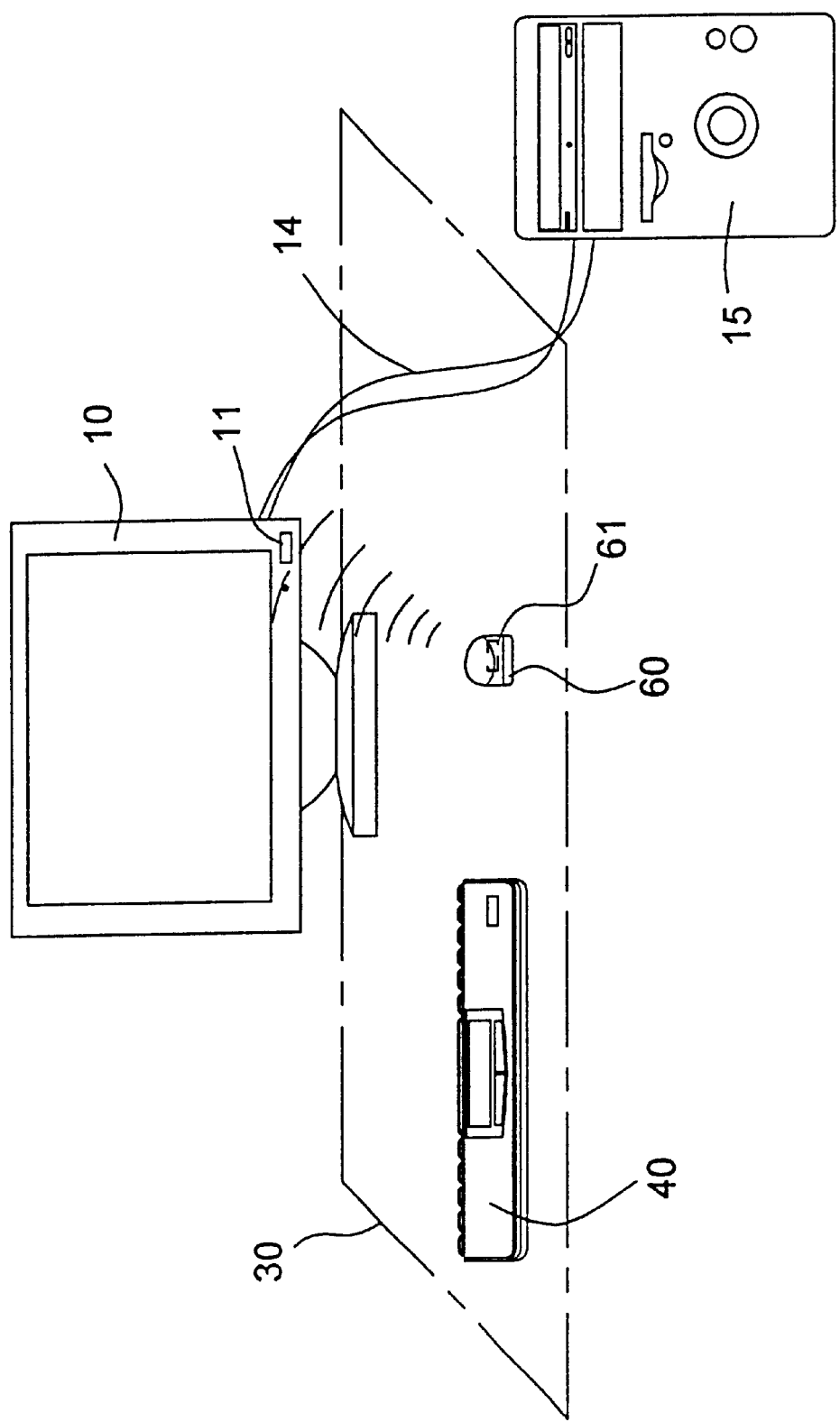
FIG. 4 is schematic view showing the application of the preferred embodiment in accordance with the present invention.

Referring to FIGS. 2 to 4, there is shown a wireless control device for a computer monitor having a host computer 15 and a monitor display 10. The housing of the monitor display 10 is provided with a wireless receiver 11 and the interior of the monitor display 10 is an IR decoder circuit 12 and the circuit 12 and the circuit board 13 are interconnected and the monitor display 10 is connected to the host computer 15 by means of signal wire 14.

Referring to FIGS. 3 and 4, the receiver 11 of the present invention is located at the monitor display 40 and the input device such as the keyboard or the mouse employ wireless connection and the monitor display 10 with the receiver 11 is positioned on the same level or lower than the key board frame. Therefore the straight distance of the input device 40 is the shortest and the wireless emitting device 41 can emit power at a very low frequency such that when the receiver 11 receivers the monitor display 10 will transmit command to the host computer for operation via the GVA signal wire such that the strength of the emitting device 41 is greatly reduced and will not be greater than that of the peripheral device.

In accordance with the present invention, the input devices can be replaced easily and other advantages of the present inventions are as follows:

1. The structure of the components of the wireless control device is simple such that input signal form the input device connected to the wireless cable will not affected for high-low signal difference, i.e., the signal can be precisely received.
2. No signal-enhancer is required so as to increase the signal from the input device connected to the wireless wire connection, and therefore no new wave interruption is produced to cause other peripheral appliances.
3. The operation environment of the computer device is efficiently changed such that the monitor display the wireless keyboard and the wireless Moines can be set on the day of manufactured and if these components are damaged, new replacement can be easily installed.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A wireless control device for a computer monitor comprising a wireless receiver mounted onto the monitor of the computer and connected to circuit of the monitor for receiving signals emitted from wireless input device; and GVA signal transmission line to transmit command to a host computer for operation, thereby the signal form the wireless input device is directly receive by the monitor without using the host computer so as to reduce emission power of the wireless input device and the input device and the monitor device are mutually integrated and the efficiency of the computer operation environment is changed.

2. The wireless control device of claim 1, wherein the computer input device is a key board.

3. The wireless control device of claim 1, wherein the computer input device is a mouse.

4. The wireless control device of claim 1, wherein the computer input device is a joystick.

5. The wireless control device of claim 1, wherein the wireless receiver on the monitor device is located at the external housing of the monitor device and wires are employed to connect the circuit board within the interior of the monitor.

6. The wireless control device of claim 1, wherein the monitor device is a monitor screen.

* * * * *